United States Patent [19]

Bar-Avi

[11] Patent Number: 5,339,690
[45] Date of Patent: Aug. 23, 1994

[54] APPARATUS FOR MEASURING THE RATE OF ROTATION AND LINEAR ACCELLERATION OF A MOVING BODY IN TWO PERPENDICULAR AXES

[75] Inventor: Patrick Bar-Avi, St. Haifa, Israel

[73] Assignee: The State of Israel, Ministry of Defence, Rafael Armament Development Authority, Tel Aviv, Israel

[21] Appl. No.: 12,936

[22] Filed: Feb. 3, 1993

[30] Foreign Application Priority Data

Nov. 5, 1992 [IL] Israel ................................ 103644

[51] Int. Cl.$^5$ ................................ G01P 9/04
[52] U.S. Cl. .................................. 73/505; 73/511
[58] Field of Search ................... 73/505, 517 AV, 511, 73/517 R, 518

[56] References Cited

U.S. PATENT DOCUMENTS

| | | | |
|---|---|---|---|
| 3,839,915 | 10/1974 | Schlitt | 73/505 |
| 4,884,446 | 12/1989 | Ljung | 73/505 |
| 4,930,351 | 6/1990 | Macy et al. | 73/505 |
| 5,142,485 | 8/1992 | Rosenberg | 364/566 |
| 5,189,913 | 3/1993 | Netzer et al. | 73/505 |
| 5,203,208 | 4/1993 | Bernstein | 73/505 |

Primary Examiner—Donald Woodiel
Attorney, Agent, or Firm—Helfgott & Karas

[57] ABSTRACT

An apparatus for measuring the rate of rotation and linear acceleration of a moving body in two perpendicular axis (X and Y). The rate of rotation is determined by measuring the force resulting from the Coriolus effect and the linear acceleration is determined by measuring the resulting force in the axis of acceleration. The apparatus includes an integral flexing unit which during rest extends in the Z axis, having a flexure zone with two degrees of flexing freedom. A proof mass is resiliently mounted on the flexing unit remote from the flexure zone with one degree of oscillation in parallel to the Z axis. The proof mass is caused to oscillate at constant amplitude by suitable electric means whereby, upon rotation of the body or linear acceleration thereof, the flexure unit oscillates by periodic bending of the flexure zone and the extent of flexure which is proportionate to the rate of rotation and/or linear acceleration, is determined by suitable electro optical means. The apparatus further includes processor means for calculating the angular velocity components about the axis of rotation and the linear acceleration components along the axis of acceleration from the extent of flexure.

8 Claims, 6 Drawing Sheets

APPARATUS FOR MEASURING THE RATE OF ROTATION AND LINEAR ACCELLERATION OF A MOVING BODY IN TWO PERPENDICULAR AXES

FIELD OF THE INVENTION

This invention relates to an apparatus for measuring the rate of rotation and linear acceleration of a moving body in two perpendicular axes.

BACKGROUND OF THE INVENTION

The determination of angular velocity as well as linear acceleration is essential in civil airplanes, missiles, combat aircraft and the like. There are known in the art many methods and apparatuses for achieving this purposes.

Thus, it is known to employ gyroscopes for the determination of rate of rotation and linear acceleration. The use of a gyroscope for such measurement resides in the principle of spinning a symmetrical rotor at very high speed about its axis of symmetry. Consequently, there will exist a very high angular momentum about this axis and, according to Law of Conservation of Angular Momentum, the angular momentum of the rotor about the spinning axis will tend to be conserved in the event of an external rotation applied to the gyroscope.

Accordingly, as an external rotation is applied to the gyroscope, a compensating moment is applied thereto whose magnitude is a function of the applied rate of spin. In reality, angular momentum is not exactly conserved on account of frictional and other losses. Therefore, in order to achieve good results, frictional losses must be minimized and the angular momentum of the rotor should be made as large as possible. Therefore, in order for gyroscopes to be sufficiently sensitive, it is necessary for a relatively massive rotor to be spun within substantially frictionless bearings at a very high rate of spin.

Such systems are inherently expensive and subject the bearings to very high forces. This, in turn, imposes a relatively short lifespan on the gyroscope.

Consequently, in spite of the popularity of the gyroscope for measuring rates of rotation, there have been moves in recent years to employ the Coriolis effect in so-called "non-gyroscopic" inertia measuring devices. The principle of the Coriolis effect is that when a body moves linearly in a specified direction whilst, at the same time, being subjected to a rotation about an axis perpendicular to the direction of linear motion, then the linear and angular velocities combine vectorially to produce a force which is applied to the body in a direction which is mutually perpendicular both to the spin axis and the direction of linear motion. The magnitude of the resultant force, called the Coriolis force, is a function of the rate of rotation at which the body rotates and may therefore be used as a basis for its determination. Thus, if:

$\omega$ = the angular velocity vector of the body,
$v$ = the linear velocity vector of the body,
$m$ = the mass of the body, and
$F$ = the magnitude of the Coriolis force, then
$F = 2 m \omega \times v$
where $\omega \times v$ is the vector cross product of the vectors $\omega$ and $v$.

The Gyrotron utilizes this phenomenon by employing a tuning-fork type of element rotated about its longitudinal axis. The times of the fork are subjected to a forced high frequency oscillation by means of a pair of electromagnetic drive coils. Since the forced oscillation is perpendicular to the axis of rotation of the fork, a Coriolis force will be generated along a mutually perpendicular, transverse axis, the magnitude of which force is detected by means of a pair of electromagnetic pick-up coils. Determination of the Coriolis response may be used to determine the rate of rotation of the fork about its longitudinal axis.

U.S. Pat. No. 3,839,915 discloses a turn rate sensor of the vibratory tuning fork type, as described above with respect to the Gyrotron. In such an arrangement, a rotation about an axis parallel to the times of the fork in combination with forced oscillation of the tines themselves, gives rise to a Coriolis force along a mutually perpendicular transverse axis. The system further provides for the compensation of asymmetry of the tuning fork and misalignment of the tine motions, so as to minimize errors.

However, while the prior art apparatus that utilize the Coriolis effect for determining the rate of rotation of a moving body are attractively compact, cheap and accurate, they all share the basic drawback of being capable of determining the angular velocity about one single axis only. In addition, known devices of this kind are incapable of measuring any linear acceleration. Consequently, if it is desired to measure the angular velocity components about three orthogonal axes and to determine the linear acceleration components along the same axes, three separate angular velocity sensors and three additional linear acceleration sensors are required, i.e. altogether six sensors. Whereas each of the sensors is relatively small the combination of two sets of three sensors each, is cumbersome, which may give rise to payload problems and in certain applications such as in missle war heads.

It is an object of the invention to provide an apparatus for determining the rate of rotation and the linear acceleration of a moving body embodying the advantages of apparatus based on the Coriolis effect capable of measuring angular velocity components of a moving body in two orthogonal axes. It is a further object of the present invention to provide an apparatus of the kind specified also capable of measuring the linear acceleration components in the same two orthogonal axes.

SUMMARY OF THE INVENTION

In accordance with the present invention there is provided an apparatus for measuring angular velocity components about first and second orthogonal axes of a moving body rotating about an axis of rotation located in the plane of said first and second axes and when the body is accelerating along an axis of acceleration within the same plane, for optionally also measuring the linear acceleration components of the moving body along said first and second axes, which apparatus comprises:

(i) an integral flexing unit comprising a base, a central shaft in alignment with a third axis normal to said first and second axes and having a free end, an axisymmetric flexure zone with two degrees of flexing freedom interposed between said base and shaft, and a deflector member at the free end of said shaft;

(ii) a proof mass resiliently mounted on said shaft remote from said flexure zone with one degree of freedom of oscillation in parallel to said third axis;

(iii) electric means with associated control means for causing said proof mass to oscillate at constant amplitude;

(iv) whereby upon either or both of any rotation of said body around said axis of rotation and any acceleration of said body along said axis of acceleration, said flexure unit flexes in an oscillating fashion at the flexure zone thereof;

(v) electro-optical means for detecting any deflection of said deflector member; and (vi) processor means for calculating either or both of the angular velocity components about and the linear acceleration components along said first and second axes from the deflection of said deflector member.

The term "integral flexing unit" denotes that the various specified components thereof are integral with each other.

If desired the said processor means may be designed to calculate also linear acceleration components along said first and second axes.

For operation, an apparatus according to the invention is mounted on a moving body, e.g. a missile, such that upon any deviation of the moving body from its present course either by way of rotation about said axis of rotation or linear acceleration along said axis of acceleration the flexing unit is caused to flex at the flexure zone. Any such flexing causes deflection of the deflector member, which is sensed by the electro-optical sensors and the signals thereby produced are fed into processor means which calculate the angular rate components about said first and second axes and, if desired, the linear acceleration components along the same axes.

Depending on whether the flexing of the flexing unit results from rotation or linear acceleration, the origin of the flexing force is different: whereas in the case of rotation, the force results from the Coriolis effect with the force vector extending normal to the axis of rotation the acting force results from the acceleration of the proof mass and its vector coincides with the axis of acceleration. In either case the acting force produces a leverage by which the flexing of the flexing unit is brought along.

BRIEF DESCRIPTION OF THE DRAWINGS

For better understanding the invention will now be described, by way of example only, with reference to the accompanying drawings in which.

DESCRIPTION OF A SPECIFIC EMBODIMENT

Figure 1:
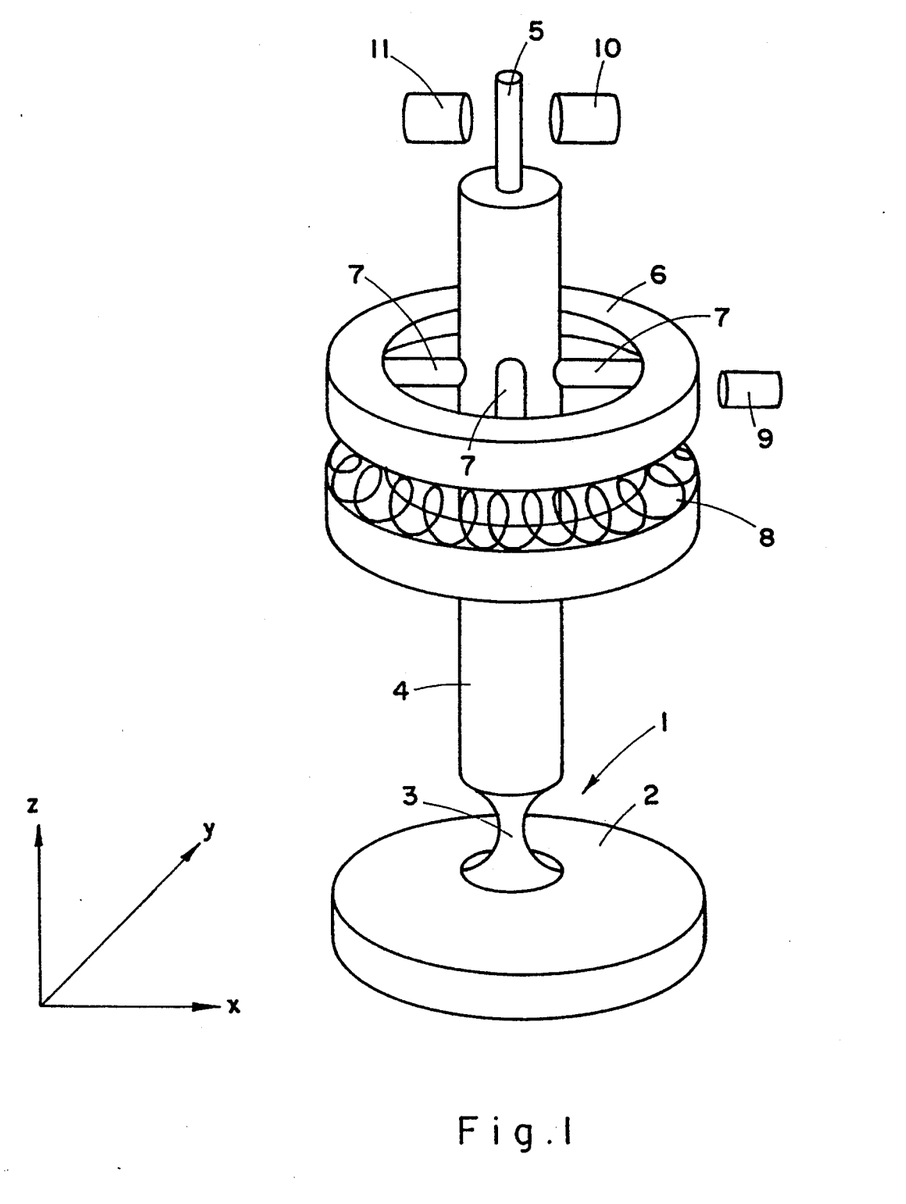
FIG. 1 is a schematic illustration of an apparatus according to the invention.

Attention is first directed to FIG. 1 showing a schematic illustration of an apparatus according to the invention. As shown the apparatus has a flexing unit 1 comprising a base 2, a flexure zone 3 and a shaft 4 bearing on its free end a deflector member 5. Base 2 serves for connection to a moving body, e.g. a missile warhead, which is not shown. The flexure zone 3 is axisymmetric and has two degrees of freedom for bending in two normal axes located in the plane defined by the x-y axes.

Mounted on shaft 4 is an annular proof mass 6 which is linked to the shaft by means of two sets of four flexible spokes 7 each, one upper set and one lower set, with every pair of adjacent spokes enclosing a right angle. In FIG. 1 only three spokes 7 of the upper set are seen while the remaining spokes are hidden. Spokes 7 enable the proof mass 6 to oscillate in longitudinal axis of shaft 4, i.e. in direction of the Z axis while it is prevented from any tilt about an axis located in the X-Y plane and is further inhibited torquing about the Z-axis. Instead of the spokes 7, functionally equivalent means may be used, e.g. a membrane.

The proof mass 6 has thus only one degree of freedom by way of oscillation along the Z-axis, and oscillations of predetermined amplitude and frequency are imparted to it by an annular electric coil 8 surrounding proof mass 6 in close proximity thereto yet clear thereof, connectable to a source of a.c. (not shown) and associated with a constant amplitude control 9 of a kind known per se. Any deflection of deflector member 5 is contingent on the flexing of flexure zone 3 and is brought about by either or both of the rotation and linear acceleration of the moving body.

The deflections of deflector member 5 are measured by a couple of non-contacting optical pick-off systems only one of which is shown schematically in FIG. 1 by way of a light source 10 and electro-optic sensor 11. The latter detects any deflection due to the flexing of flexing unit 1 at the flexure zone 3 about the X-axis. Similarly, an additional system not shown is provided for sensing flexures of the flexing unit 1 about the Y-axis.

Suitable processing means (not shown in FIG. 1) are provided to calculate the angular velocity and the linear acceleration components in the X and Y areas, as a function of the sensed deflection components in the X and Y directions.

Figure 2:
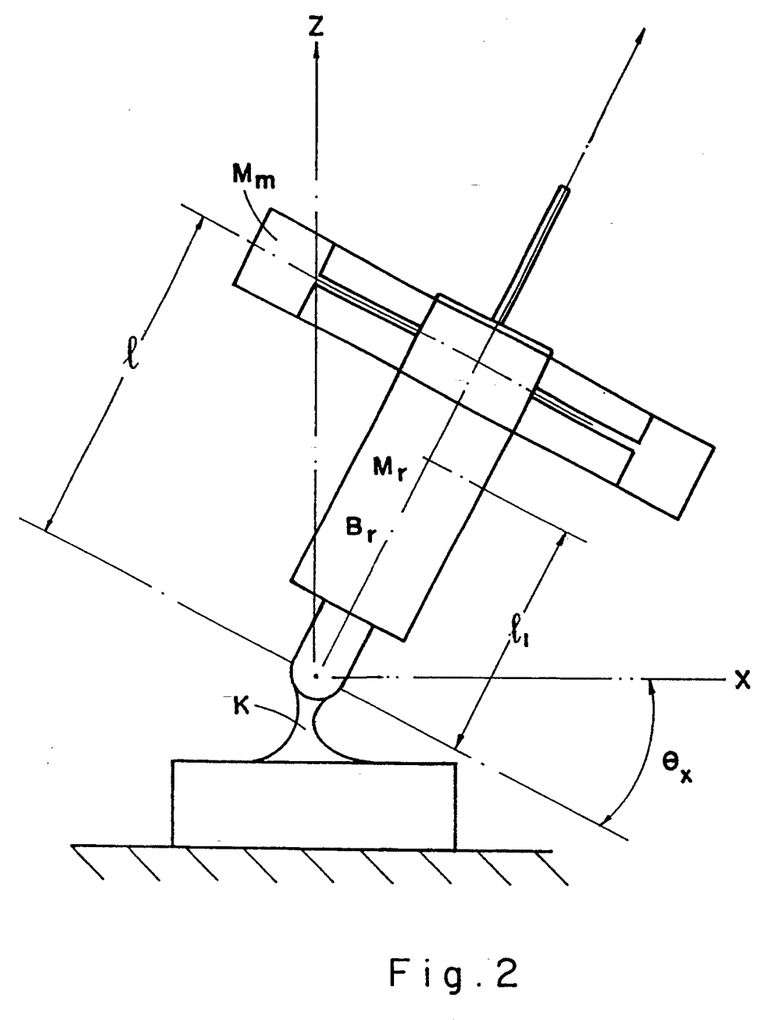
FIG. 2 is a diagrammatic model for explaining the mathematical background of the invention.

Attention is now directed to FIG. 2 for an explanation of the mathematical background on which the invention is based.

It has been found that when a moving body fitted with an apparatus according to the invention rotates about a rotation axis that resides in the X-Y plane and is further subjected to a linear acceleration along the axis of acceleration located in the same plane, the performance of the apparatus obeys the following linear equations of motion:

$$\ddot{\theta}_x\{B_r+m_r l_1^2 + m_m[l+y\cos(pt)]^2\} + \dot{\theta}_x\{2m_m yp \sin(pt)\} + K\theta_x = a_y\{l_1 m_r + m_m[l+y\cos(pt)]\} + 2m_m \omega_x yp \sin(pt) \quad (1)$$

$$\ddot{\theta}_y\{B_r+m_r l_1^2 + m_m[l+y\cos(pt)]^2\} + \dot{\theta}_y\{2m_m yp \sin(pt)\} + K\theta_y = a_x\{l_1 m_r + m_m[l+y\cos(pt)]\} + 2m_m \omega_y yp \sin(pt) \quad (2)$$

where $\theta_x$, $\dot{\theta}_x$ and $\ddot{\theta}_x$ are the measured deflection component in the x direction and its first and second time derivatives respectively.

$\theta_y$, $\dot{\theta}_y$ and $\ddot{\theta}_y$ are the measured deflection component in the y direction and its first and second time derivatives respectively.

$B_r$ and $M_r$ are the respective transverse inertia moment and the mass of shaft 4.

$l_1$ is the distance between the center of gravity of the shaft 4 and the axisymmetric flexure zone 3.

$M_m$ is the mass of the proof mass 6.

l is the distance between the center of gravity of the proof mass 6 and the axisymmetric flexure zone 3.

Y and $\rho$ are the respective amplitude and frequency oscillation of the proof mass 6.

K is the constant of elasticity of the flexure zone 3.

The solutions of equations 1 and 2 for steady state are $$\theta_x = a_y \frac{1}{(\omega_{neq})^2} + \sigma\{a_y\cos(\rho t) + 2\rho\omega_x\sin(\rho t)\} \quad (3)$$

$$\theta_y = a_x \frac{1}{(\omega_{neq})^2} + \sigma\{a_x\cos(\rho t) + 2\rho\omega_y\sin(\rho t)\} \quad (4)$$

where $$\frac{1}{(\omega_{neq})^2} = \frac{m_r l_1^2 + m_m l^2}{K}, \sigma = \frac{m_m}{I_{eq}} y \text{ and} \quad (5)$$

$$I_{eq} = B_r + m_r l_1^2 + m_m l^2$$

$a_x$, $a_y$ are the respective linear acceleration components in the x and y directions; and $\omega_x$, $\omega_y$ are the respective angular velocity components in the x and y direction.

The above equations of motion and their solutions assume that there is no damping in the system.

The oscillatory movement of the flexure unit follows from equations (3) and (4). The equations each have a static component and dynamic component. The dynamic component is determined by the cosinus and sinus functions and owing to the intrinsic nature thereof, the oscillatory movement of the flexure unit which determines the deflection angle $\theta$ at any given time is a function of the frequency $\rho$ of the proof mass 6.

The static components $$\frac{a_y}{(\omega_{neq})^2}$$

and $$\frac{a_x}{(\omega_{neq})^2}$$

in equations (3) and (4) may be filtered out by means known per se, leading to an equation in which the measured deflected angle is proportional to dynamic components only. This constitutes a significant advantage since the static components, as distinct from the dynamic ones, may be affected by external parameters such as the ambient temperature etc., which is obviously undesired.

It was further shown in accordance with the present invention that the linear acceleration components are solely dependent on the cosinus function and the angular velocity components are solely dependent on the sinus function. Thus, when the static components of equations (3) and (4) are filtered out as specified, it becomes possible to determine in a simplified and selective manner either of the angular velocity and linear acceleration. For example, if only the angular velocity is of interest, the linear component acceleration may be easily degenerated by filtering out the cosinus function, which can be done by a very simple means known per se, and conversely, where only the linear acceleration is of interest the angular velocity component is degenerated by filtering out the sinus function.

If desired, the processor means may be designed to respond only to the sinus function so as to measure only the angular rate.

It will be readily appreciated that as a result of all this the apparatus according to the invention and the associated processor means can be made in form of small size compact units.

In operation an oscillation of amplitude Y and frequency $\rho$ is imparted to the proof mass 6 by means of the electromagnetic coil 8. When the moving body rotates about a rotation axis located in the X-Y plane (see in FIG. 1), a Coriolis force results which operates in a direction normal to both the Z-axis (along which the proof mass 6 oscillates) and the axis of rotation. Each time the oscillating proof mass 6 reverses its motion from upward to downward and vice versa, the direction of the Coriolis force follows suit and this entails an oscillation of the flexing unit 1 and its deflector member 5 at the frequency of the oscillating proof mass 6 and at an amplitude depending on the angular velocity and/or linear acceleration input which determine the deflection angle $\theta$ of the flexure zone 3. The deflection angle $\theta$ yields the $\theta_x$ and $\theta_y$ components which are sensed by electro-optic pick-off means and from these sensed deflection angle components the angular velocity components $\omega_x$ and $\omega_y$ and the linear acceleration components $a_x$ and $a_y$ can be readily derived on the basis of equations (3) and (4) herein by means of suitable processing means.

Preferably, the oscillating frequency imparted to the proof mass 6 is substantially equal to its resonant frequency whereby the required electromagnetic energy input is minimized.

Also preferably, suitable means known per se are provided for compensating distortions as a result of the shaft 4 being deflected out of alignment with the Z-axis when the flexure zone 3 flexes. It should be noted here that in FIG. 2 the degree of deflection of the flexing unit 1 is deliberately exaggerated for clarity of illustration and explanation. In practice the deviation from the Z-axis is rather small of the order of 0.3° with the result that the distortion and the required compensation are also relatively small.

It is thus seen that even in regard to the measurement of angular velocity, the apparatus according to the invention constitutes a significant departure from conventional Coriolis type apparatus in that the apparatus according to the invention is capable of measuring angular rate components around two, mutually perpendicular axes while according to the prior art, only an angular rate component around one single axis could be determined.

The invention provides a further significant departure from the prior art in that in addition to angular rate it is also capable of measuring linear acceleration. Thus, when in operation the moving body is subjected to linear acceleration along an axis in the X-Y plane, the resulting force also flexes the flexure zone 3 in the manner specified. Where linear acceleration is combined with rotation, the flexing of flexure zone 3 will be the result of the combined effect of rotation and acceleration. In either case the linear acceleration can be determined independent of the angular rate by first filtering out the static components of equations (3) and (4) herein and then demodulating out the sinus function thereof.

Figure 3:
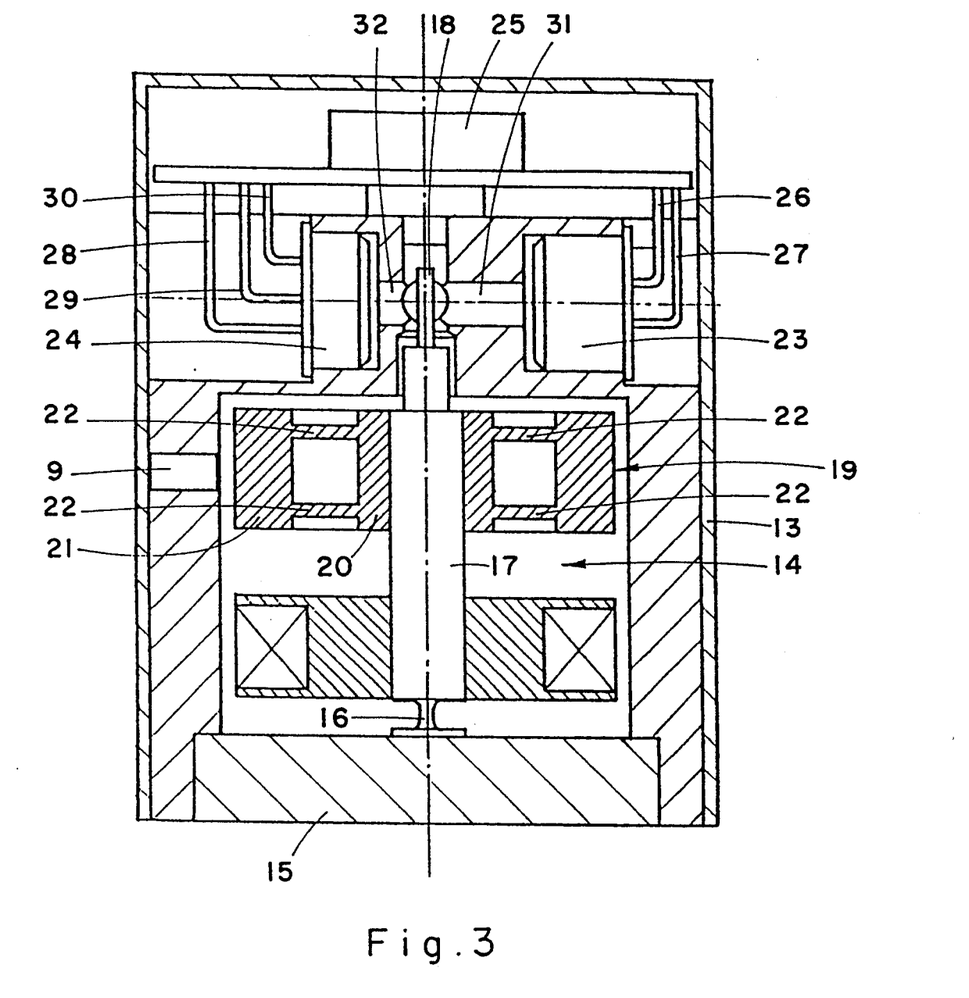
FIG. 3 is a cross-section of an apparatus according to one embodiment of the invention.
Figure 4:
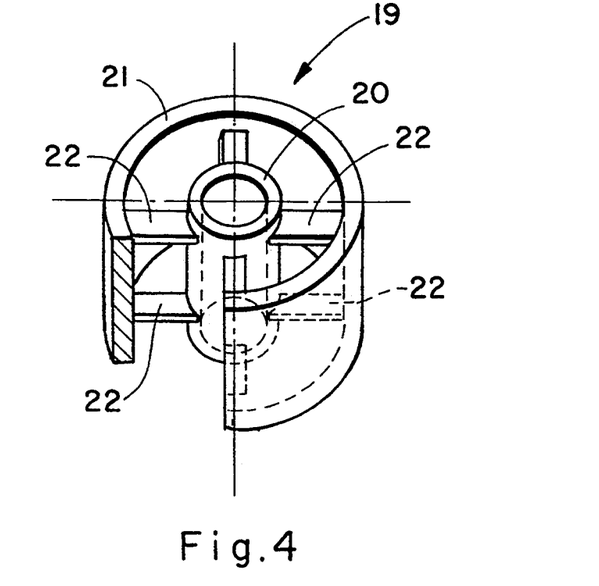
FIG. 4 is an axonometric cut-out view, of the proof mass in the embodiment of FIG. 1.

Attention is now directed to FIGS. 3 and 4 showing with some more detail the structure of one embodiment of an apparatus according to the invention. The apparatus here shown is enclosed within a housing 13 and comprises a flexing unit 14 with base 15, flexure zone 16, shaft 17 and deflector member 18. A body 19 is mounted on shaft 17 and comprises a central sleeve 20 firmly keyed on shaft 17, and an annular proof mass 21 linked to sleeve 20 by means of upper and lower sets of four flexible spokes 22 (only two of each set being shown), with every pair of adjacent spokes 22 of each set enclosing a right angle.

Deflector member 18 is associated with two pick-off assemblies (only one of which is shown in FIG. 3), comprising each a light source 23 and an electro-optic sensor 24. The pick-offs are associated with a processor generally indicated at 25 and, as shown, is connected to the light source 23 by means of wires 26 and 27 and to the electro-optical sensor 24 by means of wires 28, 29 and 30. A pair of radial bores 31 and 32 intersecting at right angles such that deflector member 18 is located in the zone of intersection of the two bores, serve to enable the projection of light generated by each light source 23 onto the associated electro-optical sensor 24.

Figure 5:
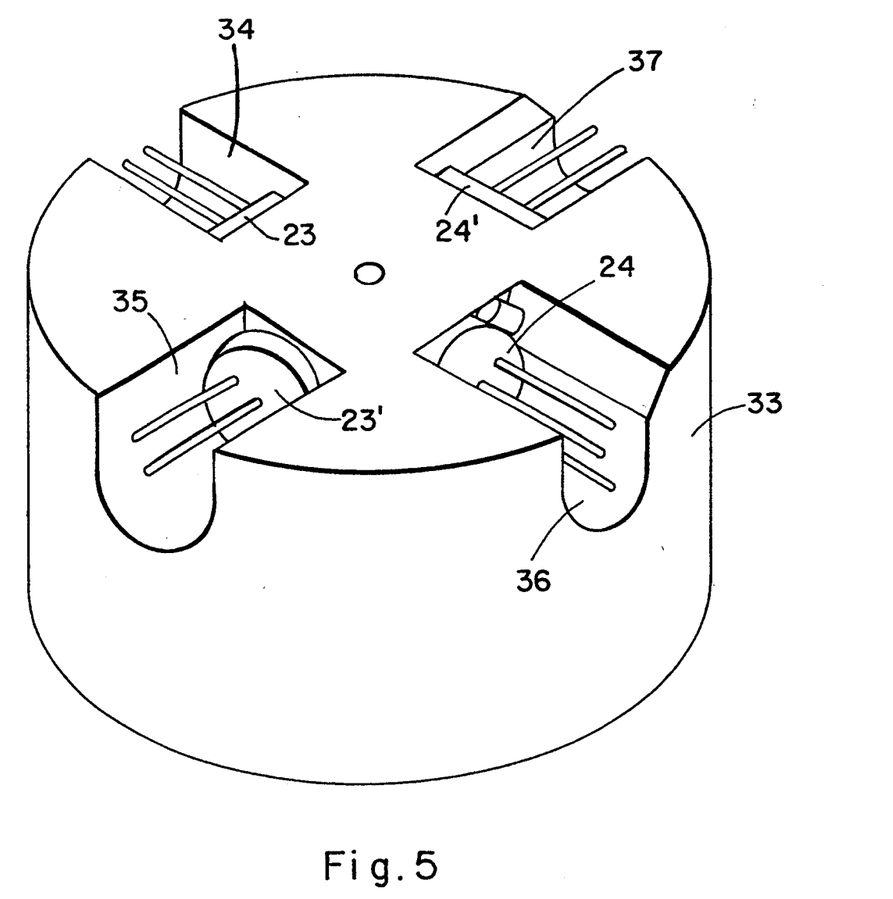
FIG. 5 is an axonometric view of the pick-off assembly of the embodiment of FIG. 1.

Attention is now directed to FIG. 5 which is a perspective view of the optical pick-off system. As shown, it comprises a block 33 with four recesses 34, 35, 36 and 37 holding, respectively, a first light source 23, a second light source 23', a first electro-optical sensor 24 and a second electro-optical sensor 24'.

In operation the deflector member 18 causes changes in the image received by the electro-optical sensors 24, 24' and the resulting pulses are transmitted to the processor 25. The operation of such a pick-off system is known per se and is described, for example, in detail in U.S. Pat. No. 5,142,485 whose description is incorporated herein by reference. Obviously, the invention is not restricted to the use of such a particular optical pick-off system and any other known system can also be used.

Figure 6:
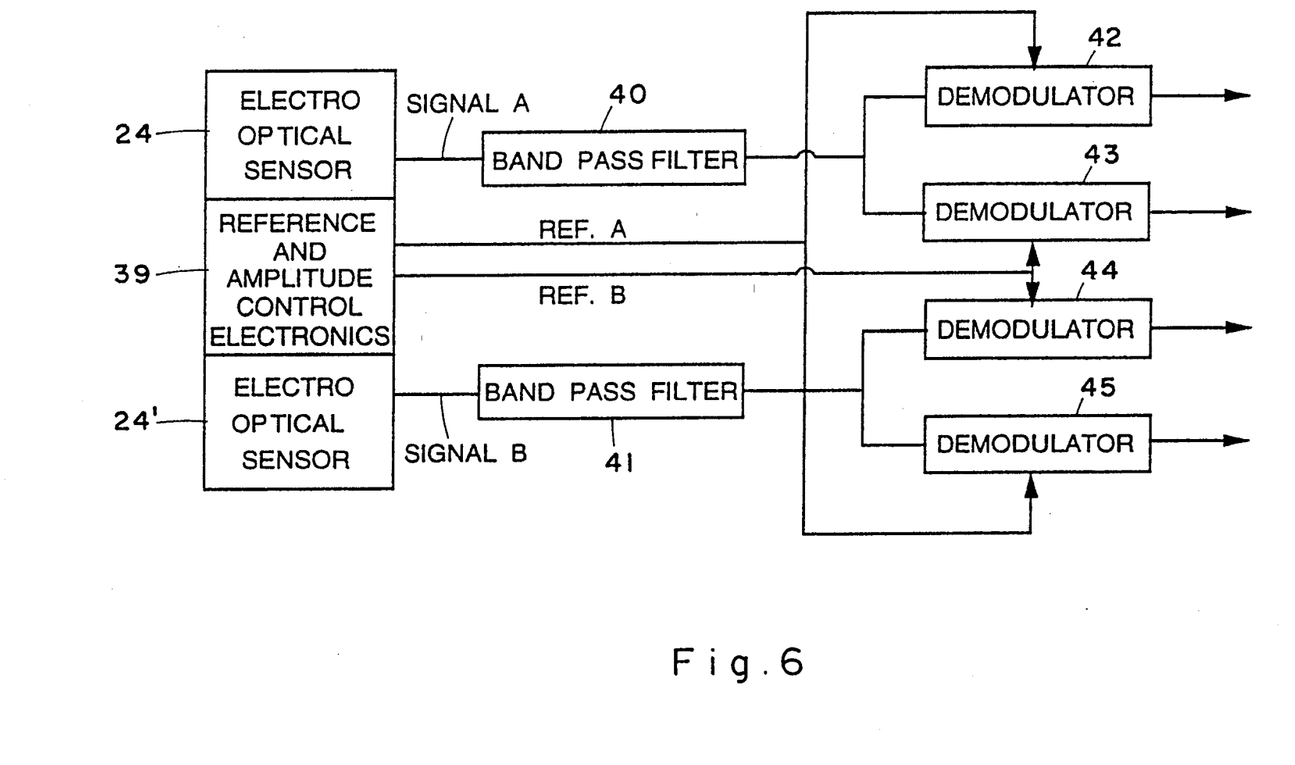
FIG. 6 is a block diagram of the processing means utilized in one embodiment of the invention for calculating both the angular rate and the linear acceleration components.

Attention is now directed to FIG. 6 which is a processor wire diagram showing the processing operation for the calculation of the angular rate components $\omega_x$ and $\omega_y$ and the linear acceleration components $a_x$ and $a_y$. As shown, the system comprises first and second electro-optical sensors 24 and 24', reference electronics 39, a first band pass filter 40, a second band pass filter 41 and four demodulators 42, 43, 44 and 45. Band pass filters 40 and 41 each filter off the static components of equations (3) and (4). Reference signals are fed into the demodulators 42 to 45 as shown whereby in one case the cosinus function is cancelled out and in the other the sinus function is cancelled out, and in this way the desired output is received on the basis of equations (3) and (4) herein.

I claim:

1. An apparatus for measuring angular velocity components about first and second orthogonal axes of a moving body rotating about an axis of rotation located in the plane of said first and second axes and when the body is accelerating along an axis of acceleration within the same plane, for optionally also measuring the linear acceleration components of the moving body along said first and second axes, which apparatus comprises:

(i) an integral flexing unit comprising a base, a central shaft in alignment with a third normal to said first and second axes and having a free end, an axisymmetric flexure zone with two degrees of flexing freedom interposed between said base and shaft, and a deflector member at the free end of said shaft;

(ii) a proof mass resiliently mounted on said shaft remote from said flexure zone with one degree of freedom of oscillation in parallel to said third axis;

(iii) electric means with associated control means for causing said proof mass to oscillate;

(iv) whereby upon either or both of any rotation of said body around said axis of rotation and any acceleration of said body along said axis of acceleration, said flexure unit flexes in an oscillating fashion at the flexure zone thereof;

(v) electro-optical means for detecting any deflection of said deflector member; and (vi) processor means for calculating either or both of the angular velocity components about and the linear acceleration components along said first and second axes from the deflection of said deflector member.

2. An apparatus according to claim 1, wherein said processor means are programmed for calculating only the angular velocity components about said first and second axes.

3. An apparatus according to claim 1, wherein said processor means are programmed for calculating only the linear acceleration components along said first and second axes.

4. An apparatus according to claim 1, wherein said processor means are programmed for calculating both the angular velocity components about and the linear acceleration along said first and second axes.

5. An apparatus according to claim 1, wherein said electrooptical means for detecting any deflection of said deflector member comprise a couple of non-contacting optical pick-of systems each of which have a light source and an electro-optic sensor.

6. An apparatus according to claim 1, wherein said electric means with associated control means for causing said proof mass to oscillate at constant amplitude is an electric coil connectable to an a.c. source.

7. An apparatus according to claim 1, wherein said proof mass is annular and is linked to the shaft of said flexure unit by radial spokes.

8. An apparatus according to claim 7, wherein said electric coil is annular and surrounds said proof mass in close proximity thereto yet clear thereof.

* * * * *

UNITED STATES PATENT AND TRADEMARK OFFICE
CERTIFICATE OF CORRECTION

PATENT NO. : 5,339,690

DATED : August 23, 1994

INVENTOR(S) : Patrick Bar-Avi

It is certified that error appears in the above-identified patent and that said Letters Patent is hereby corrected as shown below:

On cover page, change title to read, item

--[54] APPARATUS FOR MEASURING THE RATE OF ROTATION AND LINEAR ACCELERATION OF A MOVING BODY IN TWO PERPENDICULAR AXES--.

Col. 1, line 3, please change "ACCELLERATION" to --ACCELERATION--.

Signed and Sealed this

Twenty-ninth Day of November, 1994

Attest:

BRUCE LEHMAN

*Attesting Officer*  *Commissioner of Patents and Trademarks*